(12) United States Patent
Jordil et al.

(10) Patent No.: US 6,745,488 B2
(45) Date of Patent: Jun. 8, 2004

(54) HEIGHT-MEASURING COLUMN AND METHOD FOR REGULATING A HEIGHT-MEASURING COLUMN

(75) Inventors: Pascal Jordil, Ecoteaux (CH); Adriano Zanier, Prilly (CH)

(73) Assignee: Brown & Sharpe TESA SA, Renens (CH)

( * ) Notice: Subject to any disclaimer, the term of this patent is extended or adjusted under 35 U.S.C. 154(b) by 0 days.

(21) Appl. No.: 10/314,805

(22) Filed: Dec. 9, 2002

(65) Prior Publication Data

US 2003/0106235 A1 Jun. 12, 2003

(30) Foreign Application Priority Data

Dec. 12, 2001 (EP) ............................................. 01811219

(51) Int. Cl.$^7$ ................................................. G01B 5/02
(52) U.S. Cl. ....................................................... 33/832
(58) Field of Search ........................... 33/832, 833, 535

(56) References Cited

U.S. PATENT DOCUMENTS

| | | |
|---|---|---|
| 3,753,295 A | 8/1973 | Hecklinger |
| 4,667,922 A | 5/1987 | Cutburth et al. |
| 5,373,645 A | 12/1994 | Bezinge et al. |
| 6,446,351 B1 * | 9/2002 | Zhang et al. ................. 33/832 |

FOREIGN PATENT DOCUMENTS

| | | |
|---|---|---|
| CH | 236 041 A | 1/1945 |
| FR | 2 201 756 A | 4/1974 |

\* cited by examiner

*Primary Examiner*—Christopher W. Fulton
(74) *Attorney, Agent, or Firm*—Pearne & Gordon LLP

(57) ABSTRACT

Height-measuring column comprising a supporting frame fastened to a base, said supporting frame determining the measuring axis, it being possible to regulate the perpendicularity between the supporting frame and the base and method for regulating the perpendicularity of a height-measuring column relative to a reference surface by regulating the perpendicularity between the supporting frame and the base of said height-measuring column.

24 Claims, 3 Drawing Sheets

HEIGHT-MEASURING COLUMN AND METHOD FOR REGULATING A HEIGHT-MEASURING COLUMN

This application claims priority of European Patent Application EP 01811219.3, the content of which is hereby incorporated.

FIELD OF THE INVENTION

The present invention concerns a height-measuring column. The present invention concerns also the method for regulating a height-measuring column according to the invention.

RELATED ART

Height-measuring columns are measuring machines enabling the height of a point relative to a reference plane to be measured or the vertical distance between to measuring points to be calculated. The precision that is expected of such measuring machines is on the order of the micron.

The main elements of a height-measuring column are generally:

a base;

a supporting frame;

a carriage;

a probe tip;

a measuring system;

a driving mechanism.

The base is the element through which the height-measuring column is in contact with the floor, generally a plane surface that can serve as reference to the measuring reference frame. The base also ensures the stability of the height-measuring column.

The supporting frame is essentially perpendicular to the base's seat and generally has on its length rails guiding the displacement of the carriage. It thus determines the measuring axis, essentially perpendicular to the plane of the base's seat of the height-measuring column.

The carriage is the mobile element of the height-measuring column. It moves on the supporting frame along the measuring axis, generally on perfectly rectilinear rails guiding its movement and ensuring that it is fastened.

The probe tip is mounted on the carriage and is designed for being brought into contact with the piece to be measured. The contact point is determined either visually, or automatically, for example by a mechanism stopping the carriage's movement as soon as a pressure exceeding a predetermined threshold is exerted on the probe tip. The height of the contact point can then be measured.

The measuring system comprises elements for example inductive, capacitive or opto-electronic integrated to the supporting frame, enabling the carriage's position along the measuring axis to be determined accurately. The measuring system is generally equipped with a system for displaying the measure and/or with an information processing software.

The driving mechanism controls the displacement of the carriage on the supporting frame. It is generally an electric motor driving a belt or cable fastened to the carriage and guided by a pulley at the top and sometimes at the bottom of the supporting frame. The driving mechanism has mechanical and/or electronic controls enabling an accurate positioning of the carriage and therefore of the probe tip.

In order to guarantee the accuracy of the height measuring, it is important that the measuring axis be perpendicular to the reference surface. However, possible measuring errors caused by a slight inaccuracy of this parameter are small, so that this perpendicularity is rarely ideal in the prior art height-measuring columns. Furthermore, many columns have a electronic correction circuit, enabling the linear measuring error on the vertical axis caused by a non-perpendicularity to be compensated, the correction circuit being calibrated at manufacture by comparison with a standard gauge measure. A correction of the measuring in workshops is however difficult, as most of the workshops do not have the required standard gauge measures.

However, a height-measuring column can also be used for perpendicular measuring. The probe tip can in this case be replaced by a comparator that is displaced flush along a surface of the piece to be measured, detecting any variation in the distance between the surface to be measured and the displacement axis of the comparator. For such an application, the perpendicularity between the measuring axis and the reference surface becomes the essential factor of the measuring accuracy. This perpendicularity must consequently be perfectly regulated. An electronic correction circuit is superfluous, since the information supplied by the comparator is binary.

There are measuring columns whose perpendicularity between the supporting frame and the base's seat is guaranteed by the manufacturing precision of these elements. The contact surfaces between the base and the supporting frame are manufactured with the greatest precision, ensuring a perfect assembly. The base's seat must also be perfectly plane to give the supporting frame a position perfectly perpendicular relative to the reference surface. A variant embodiment uses the upper part of the base as reference surface and in that case, it is the later that must be manufactured with the greatest precision. Whichever option is chosen, such a manufacture is costly and complicated since both the quality of the manufacturing of the pieces and their assembly must be performed with the greatest care. Furthermore, since the resting length of the piece to be measured on the base or on the reference surface is smaller than the column's height, any manufacturing imprecision being further amplified at the level of the resulting perpendicularity.

Other measuring columns have a base whose seat can be regulated, thus enabling the parallelism between the base and the reference surface to be regulated. These systems are usually realized by means of adjustable feet. These solutions are also rather costly since they involve a certain complexity in the manufacturing of the base. Furthermore, such a mechanism is not very stable through time and its setting must be controlled frequently.

It is an aim of the present invention to propose an easy and sturdy way of regulating the perpendicularity between the measuring axis of a height-measuring column and the work surface.

BRIEF SUMMARY OF THE INVENTION

According to the invention, this aim is achieved by means of a measuring column having the characteristics of the first independent claim. This aim is further achieved by means of a regulating method indicated in the second independent claim.

In particular, this aim is achieved by means of a height-measuring column whose perpendicularity between the supporting frame and the base can be regulated, thus allowing by extension the perpendicularity of the measuring axis relative to the reference surface to be regulated.

The regulating of the perpendicularity between the supporting frame and the base of the height-measuring column makes it possible to compensate the inaccuracies in the parallelism or in the regularity of the contact surfaces between the different elements of the height-measuring column, in particular between the supporting frame and the base. Thus, the manufacture of these pieces is simplified and the costs are reduced.

DESCRIPTION OF THE DRAWINGS

The invention will be better understood by reading the description of a preferred embodiment given by way of example and illustrated by the attached drawings, in which.

DETAILED DESCRIPTION OF THE INVENTION

Figure 1:
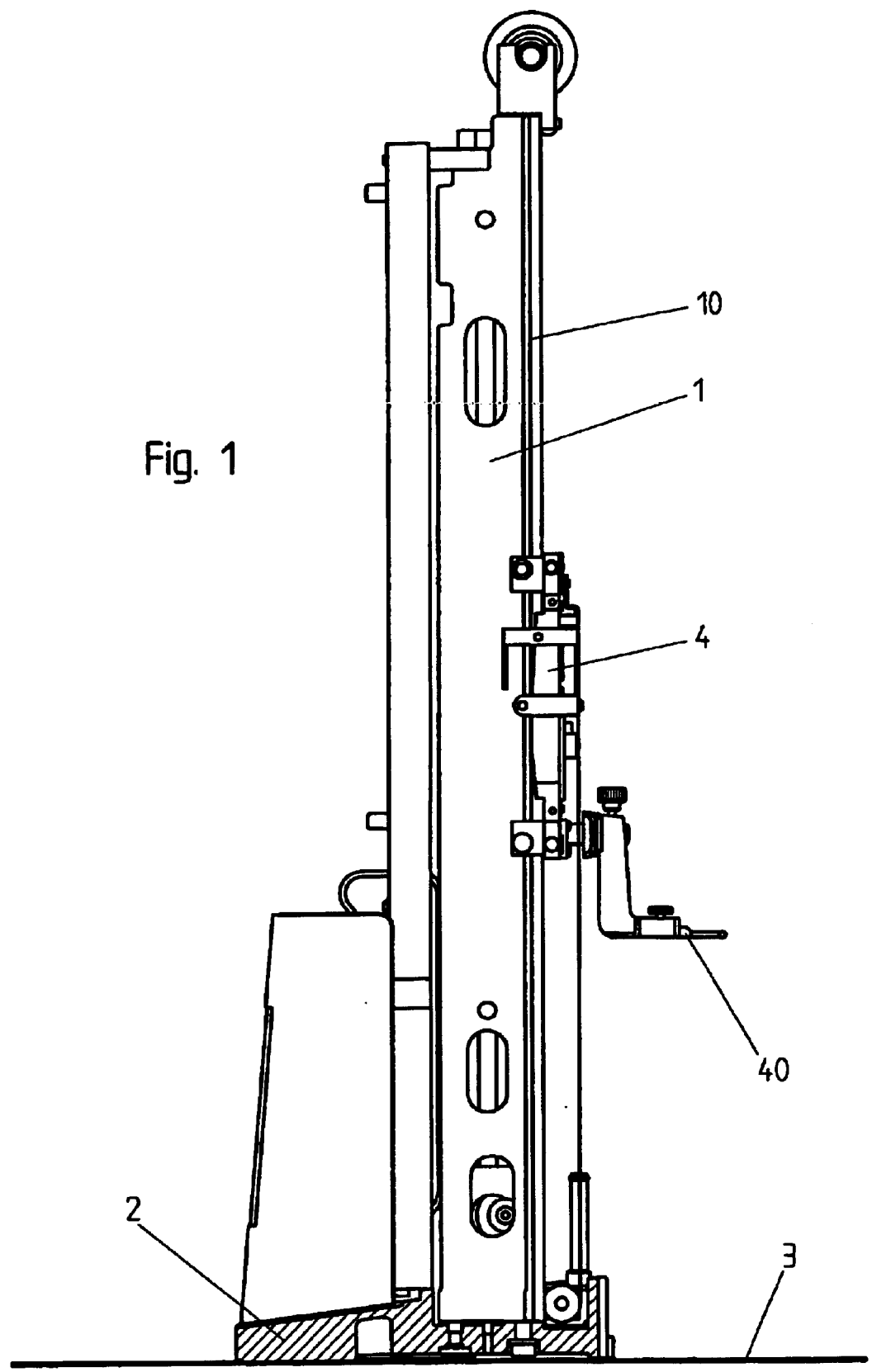
FIG. 1 shows a simplified view of a height-measuring column.

The preferred embodiment of the invention is a height-measuring column comprising a supporting frame 1 fastened on a base 3 perpendicular to the seat of this base 2, a carriage 4 moving on rails 10 along the supporting frame 1 thus defining the measuring axis. According to the applications, for example a probe tip 40 or a comparator (not represented) will be fastened on the carriage 4. The height-measuring column according to the preferred embodiment of the invention also comprises a measuring system in order to determine exactly the position of the carriage on the supporting frame and, by extension, to determine the coordinates on the position measuring axis, for example of the probe tip or of the comparator fastened to the carriage. The height-measuring column further comprises a driving mechanism controlling the movements of the carriage 4 along the supporting frame 1.

The height-measuring column according to the preferred embodiment of the invention is designed to function on a plane reference surface 3 that can serve as zero point of the measuring axis, for example a marble or granite table.

The supporting frame 1 of the height-measuring column is fastened to the base 2 by means of fastening elements. The function of the fastening elements is to ensure that the supporting frame 1 is held on the base 2 and that any mechanical play between these elements after assembly is avoided. In the preferred embodiment of the height-measuring column, these fastening elements are for example three fastening screws 7. The fastening screws 7 are inserted in the holes provided for this purpose under the base 2 of the height-measuring column, then screwed in the holes threaded at the bottom of the supporting frame 1 located opposite the holes of the base 2 when the base 2 and the supporting frame 1 are assembled. The fastening screws 7 are preferably fillister-head screws provided with washers 70 in order to spread the force exerted around the head on the base 2 during screwing. In order to avoid unscrewing after assembly of the fastening screws 7, the washers 70 will preferably be of the self-blocking type and can be secured by a drop of glue or of a screw locking product.

The regulating of the perpendicularity is performed by means of regulating elements. These regulating elements are for example two regulating screws 5 parallel to the fastening screws 7. The regulating screws 5 are screwed in the threaded holes provided for this purpose in the base 2. Their extremity rests against the lower surface of the supporting frame 1, thus exerting on the supporting frame a force in the opposite direction of that of the force exerted by the fastening screws 7. In order to ensure a homogenous effort of the regulating screws 5 and avoid deforming the base of the supporting frame 1 when regulating, brass pellets 6 with parallel sides are preferably intercalated between the regulating screws 5 and the base of the supporting frame 1.

Regulating screws are preferably prestressed by the tightening of the fastening screws 7. During assembly, the three fastening screws 7 are first tightened at 60–70% of the blocking force. The two regulating screws are then screwed until a certain force is exerted against the lower surface of the supporting frame 1. The fastening screws 7 are finally blocked and then possibly further secured against unscrewing, for example by adjunction of a drop of glue or of a screw locking product around the screw's head.

Figure 2:
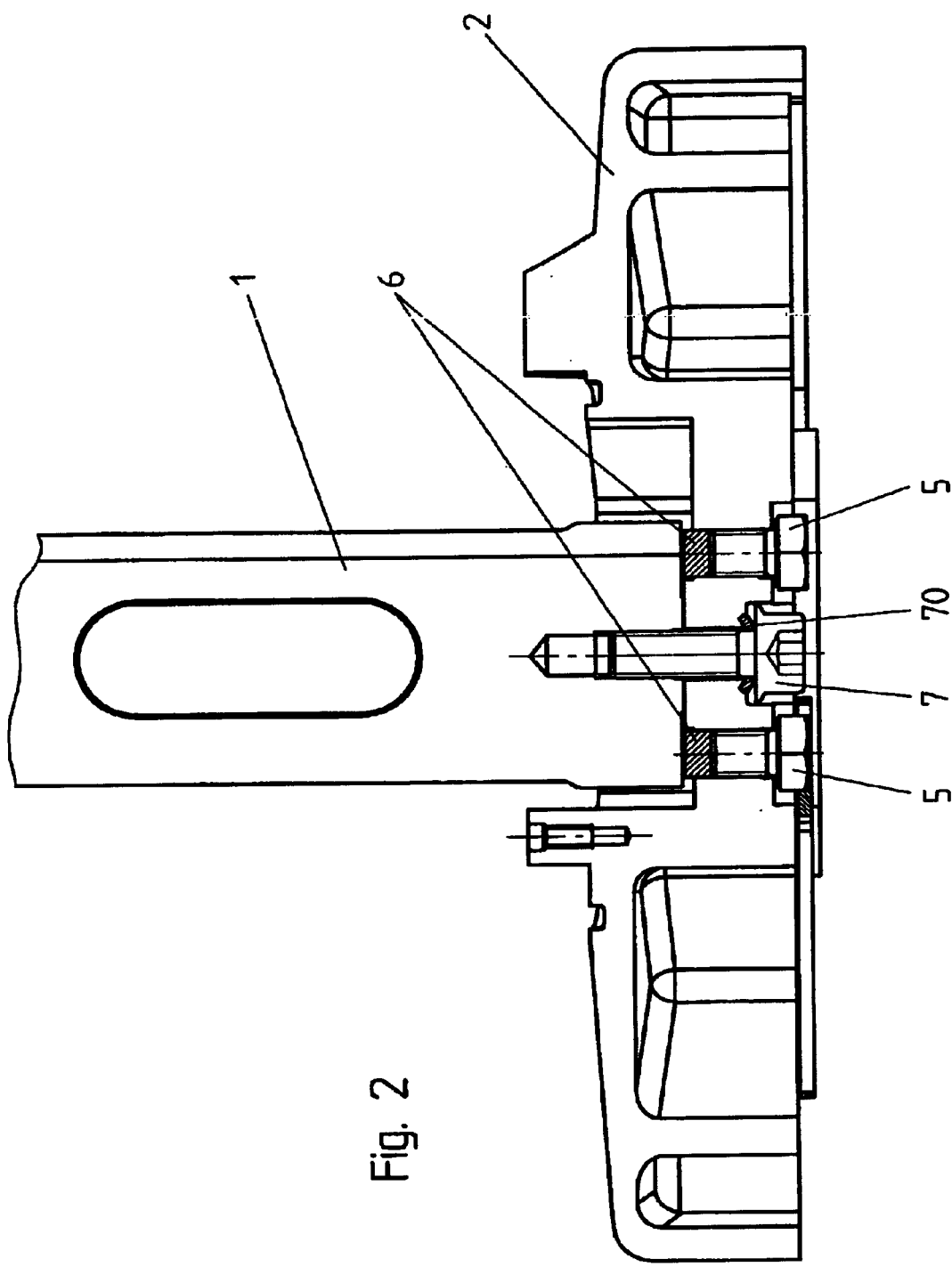
FIG. 2 shows a cross section of the base and of the seat of the supporting frame of a height-measuring column according to the invention.
Figure 3:
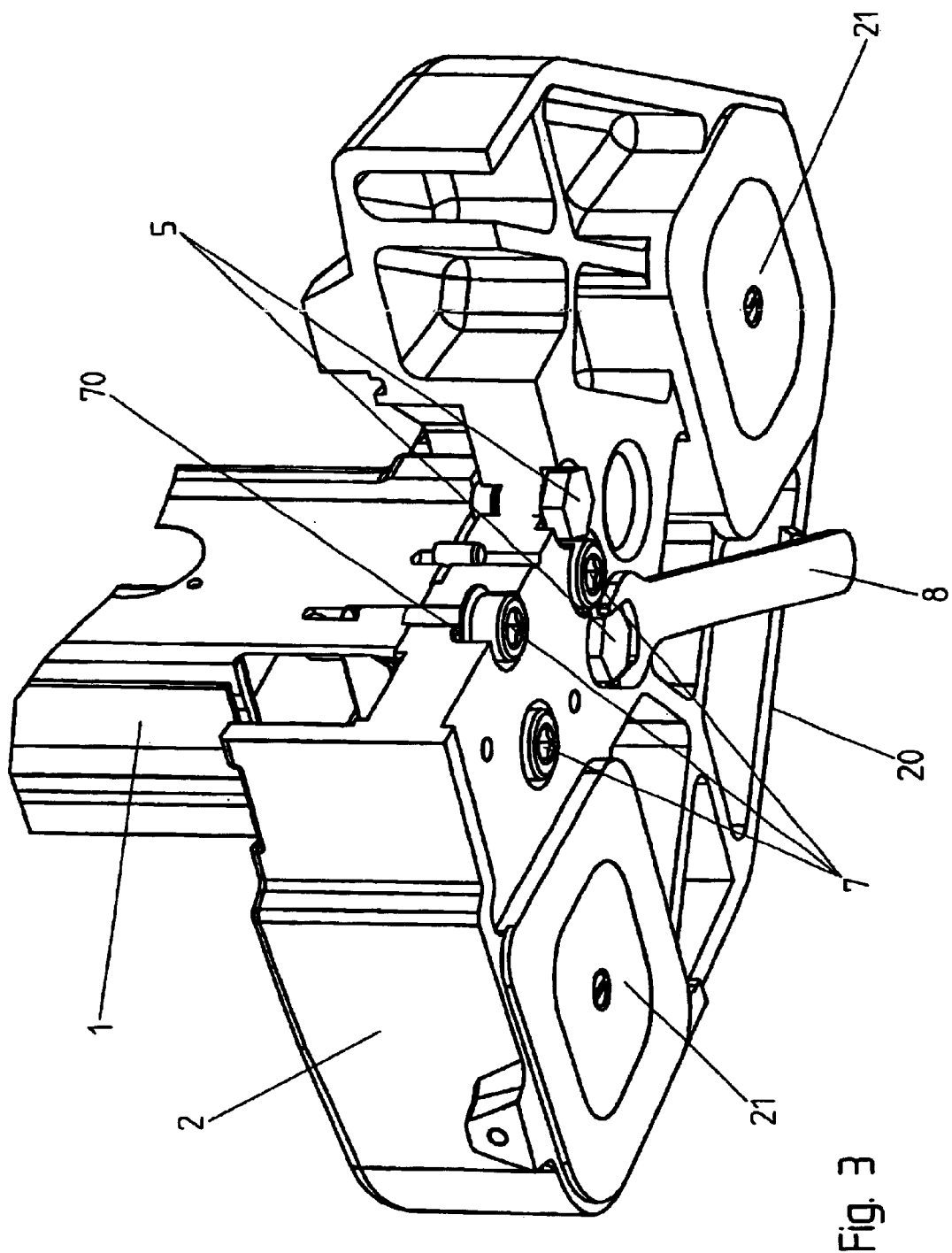
FIG. 3 shows a view in perspective of the base and of the seat of the supporting frame of a height-measuring column according to the invention.

In the preferred embodiment of the invention, the three fastening screws 7 are placed along an equilateral triangle having a base and a height more or less equal to three times the diameter of the head of said fastening screws 7. The two regulating screws 5 are preferably placed on each side of the fastening screw situated at the top of said equilateral triangle, along an axis parallel to the base of said equilateral triangle, the spacing between the regulating screws 5 being more or less equal to the spacing between the two fastening screws forming the base of said equilateral triangle. The screwing of a regulating screw and unscrewing of the opposite regulating screw allows the position of the supporting frame 1 to be regulated relative to the base 2 in a plane parallel to the plane formed by the two regulating screws 5, i.e., in the represented embodiment, in a plane parallel to the plane of the section of FIG. 2. The screwing or unscrewing of the two regulating screws 5 allows the position of the supporting frame 1 to be regulated relative to the base 2 in a plane perpendicular to the plane formed by the two regulating screws 5, i.e., in the represented embodiment, in a plane perpendicular to the plane of the section of FIG. 2.

Before the first use of the height-measuring column, the perpendicularity between the measuring axis connected to the supporting frame 1 and the reference surface 3 must be adjusted. The height-measuring column is placed vertically 2 on the reference surface 3. The screwing of each regulating screw 5 is then adjusted alternatively until the sought precision has been achieved. The regulating screws 5 are preferably hexagon head screws that can be thus regulated by means of an adapted wrench 8 slid under an aperture 20 at the bottom of the base 2. A variant embodiment would be to regulate the perpendicularity on a reference surface in which a hole allows access to the regulating screws from below. This variant embodiment is however less comfortable for the operator in charge of regulating the perpendicularity.

The temporal stability of the perpendicularity adjustment of a height-measuring column according to the invention is ensured by the fact that the regulating screws 5 are prestressed. The regulating screws 5 being strongly compressed, their material is constantly at the limits of its elasticity, thus reducing the amplitude of a possible subsequent compression. The adjustment's temporal stability is also improved by spreading the fastening elements and the regulating elements on a square surface whose side is more or less equal to the length of a fastening element framed by two regulating elements. The limitation of this surface ensures a very short closing of the force loop, thus limiting the material's fatigue that could for example result in constant torque moments that are too great.

In the preferred embodiment of the height-measuring column as described here above, the supporting frame is fastened to the base with three fastening screws. The one skilled in the art will easily understand that the function of the fastening screws 7 according to the invention is to fasten the two elements together rigidly. It is conceivable to realize this fastening by means of other fastening elements, such as for example hooks or notches.

In an advantageous embodiment of the height-measuring column according to the invention, the lower side of the base 2 contains cavities 21 in which a stream of compressed air with a non-singular direction circulates. When the height-measuring column is regulated, the air is drawn in from the ground, thus strongly pinning the measuring column onto the reference surface 3 and ensuring a good stability. This prevents the column from moving or even overturning during adjustment. When the height-measuring column has to be displaced, the air stream is reversed, thus slightly lifting the height-measuring column and making it easier to displace it.

What is claimed is:

1. A height-measuring column comprising:
    a base;
    a supporting frame fastened to said base;
    at least one regulating element for regulating perpendicularity between said base and said supporting frame.

2. The height-measuring column of claim 1, said supporting frame being fastened to said base by means of at least one fastening element.

3. The height-measuring column of claim 2, the blocking of said at least one fastening element being secured by the adjunction of glue or of a screw locking product.

4. The height-measuring column of claim 1, said supporting frame being fastened to said base by means of three fastening elements, said three fastening elements being constituted by three fastening screws.

5. The height-measuring column of claim 4, said fastening screws being located under said base.

6. The height-measuring column of claim 4, said three fastening screws being placed along an equilateral triangle whose base and height are more or less equal to three times the diameter of the head of said fastening screws.

7. The height-measuring column of claim 1, said regulating element exerting between the supporting frame and the base a force in the direction opposite to that of the direction of the force exerted by said at least one fastening element.

8. The height-measuring column of claim 1, the perpendicularity between said supporting frame and said base being regulated by means of two regulating elements, said two regulating elements being constituted of two regulating screws.

9. The height-measuring column of claim 8, said regulating screws being located under said base.

10. The height-measuring column of claim 8, said supporting frame being fastened to said base by means of three fastening screws placed along an equilateral triangle,
    said two regulating screws being placed on each side of the fastening screw situated at the top of said equilateral triangle, along an axis parallel to the base of said equilateral triangle, the spacing between the regulating screws being more or less equivalent to the spacing between the two fastening screws forming the base of said equilateral triangle.

11. The height-measuring column of claim 8, said regulating screws being prestressed during assembly of said height-measuring column through the blocking of said fastening elements.

12. Height-measuring column according to one of the claims 8 to 11, said regulating screws being hexagon head screws.

13. The height-measuring column of claim 1, said base comprising an aperture allowing the regulating elements to be adjusted when said height-measuring column is placed vertically on said base.

14. The height-measuring column of claim 1, said base comprising cavities in which a stream of compressed air with a non-singular direction can circulate.

15. A method for regulating the perpendicularity of a height-measuring column relative to a reference surface comprising the following step: regulating the perpendicularity between the supporting frame and the base of the height-measuring column.

16. The regulating method of claim 15, said regulating being performed by screwing/unscrewing at least one regulating screw.

17. The regulating method of claim 16, said regulating being performed by means of a wrench through an aperture in the seat of said base.

18. The regulating method of claim 15, said base being pinned onto said reference surface by the action of an air stream circulating in the cavities of said base.

19. A method for assembling the supporting frame of a height-measuring column on the base of a height-measuring column, comprising the following steps:
    screwing fastening elements of said supporting frame onto said base with a force corresponding to 60–70% of the blocking force;
    screwing the elements for regulating the perpendicularity of said supporting frame relative to said base until a predetermined force;
    screwing said fastening elements until 100% of the blocking force.

20. The assembly method of claim 19, comprising the additional step of securing the blocking of said fastening elements by the adjunction of glue or of a screw locking product.

21. The assembly of claim 19, comprising the additional step of regulating the perpendicularity between the supporting frame and the base of the height-measuring column.

22. Height-measuring column according to claim 21, said regulating screws being hexagon head screws.

23. A height-measuring column comprising:
    a supporting frame,
    a base,
    three fastening screws placed along an equilateral triangle for fastening said supporting frame to said base,
    two regulating screws, placed on each side of the fastening screw situated at the top of said equilateral triangle, along an axis parallel to the base of said equilateral triangle, the spacing between the regulating screws being more or less equivalent to the spacing between the two fastening screws forming the base of said equilateral triangle, for regulating the perpendicularity between said base and said supporting frame.

24. A method for regulating the perpendicularity of a height-measuring column relative to a reference surface comprising the following steps: pinning said base onto said reference surface by the action of an air stream circulating in cavities of said base, regulating the perpendicularity between the supporting frame and the base of the height-measuring column.

* * * * *